United States Patent
Park et al.

(10) Patent No.: US 10,328,819 B2
(45) Date of Patent: Jun. 25, 2019

(54) FUEL CELL SYSTEM AND CONTROL METHOD THEREOF

(71) Applicant: Hyundai Motor Company, Seoul (KR)

(72) Inventors: GunHyung Park, Busan (KR); JunYoung Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 345 days.

(21) Appl. No.: 15/258,032

(22) Filed: Sep. 7, 2016

(65) Prior Publication Data
US 2017/0305295 A1    Oct. 26, 2017

(30) Foreign Application Priority Data
Apr. 21, 2016    (KR) .................. 10-2016-0048813

(51) Int. Cl.
| | |
|---|---|
| *H01M 8/04* | (2016.01) |
| *B60L 11/18* | (2006.01) |
| *H01M 8/04223* | (2016.01) |
| *H01M 8/04992* | (2016.01) |
| *H01M 8/04746* | (2016.01) |
| *H01M 8/0438* | (2016.01) |
| *B60L 50/72* | (2019.01) |

(52) U.S. Cl.
CPC .......... *B60L 11/1883* (2013.01); *B60L 50/72* (2019.02); *H01M 8/04231* (2013.01); *H01M 8/04388* (2013.01); *H01M 8/04753* (2013.01); *H01M 8/04992* (2013.01); *H01M 2250/20* (2013.01); *Y02T 90/32* (2013.01); *Y02T 90/34* (2013.01)

(58) Field of Classification Search
CPC ......... H01M 8/04388; H01M 8/04753; H01M 8/04992; H01M 2250/20; B60L 11/1883; B60L 11/1898

USPC ........................................................ 429/444
See application file for complete search history.

(56) References Cited

U.S. PATENT DOCUMENTS

| | | | |
|---|---|---|---|
| 2002/0189557 A1 | 12/2002 | Williges | |
| 2011/0084638 A1 | 4/2011 | Patel et al. | |
| 2016/0149242 A1* | 5/2016 | Asai | H01M 8/04104 429/446 |

FOREIGN PATENT DOCUMENTS

| | | |
|---|---|---|
| JP | 2005-302489 A | 10/2005 |
| JP | 2007-087811 A | 4/2007 |

(Continued)

OTHER PUBLICATIONS

Korean Notice of Allowance for Korean Patent Application No. 10-2016-0048813, dated Feb. 20, 2018, 1 page, English Abstract.

*Primary Examiner* — Anthony R Jimenez
(74) *Attorney, Agent, or Firm* — Mintz Levin Cohn Ferris Glovsky and Popeo, P.C.; Peter F. Corless

(57) ABSTRACT

A fuel cell system and method of controlling the fuel cell system are provided. The fuel cell system includes a fuel cell stack that is configured to receive fuel, and generate electric energy and a fuel supply valve that is configured to adjust pressure of fuel that is supplied to the fuel cell stack. A controller is configured to operate the fuel supply valve to supply fuel of predetermined target pressure to the fuel cell stack, using a difference between the predetermined target pressure and actual pressure of the fuel being supplied. When the actual pressure reaches a steady state from a transient state, the controller applies a smaller gain than in the transient state to determine a first controlled variable based on the difference between the target pressure and the actual pressure of the fuel being supplied.

18 Claims, 10 Drawing Sheets

(56) References Cited

FOREIGN PATENT DOCUMENTS

| | | | |
|---|---|---|---|
| JP | 2008-140741 | A | 6/2008 |
| JP | 4624694 | B2 | 2/2011 |
| KR | 10-2002-0079361 | A | 10/2002 |
| KR | 2007-0036484 | A | 4/2007 |
| KR | 2007-0088739 | A | 8/2007 |
| KR | 10-2015-0074311 | A | 7/2015 |
| KR | 2015-0118296 | A | 10/2015 |

* cited by examiner

FUEL CELL SYSTEM AND CONTROL METHOD THEREOF

CROSS-REFERENCE TO RELATED APPLICATION

This application claims the benefit of Korean Patent Application No. 10-2016-0048813, filed on Apr. 21, 2016 in the Korean Intellectual Property Office, the disclosure of which is incorporated herein by reference.

BACKGROUND

1. Field of the Disclosure

The present disclosure relates to a fuel cell system of generating electric power using supplied fuel, and a method of controlling the fuel cell system, and more particularly, to a fuel cell system that determines a controlled variable of a fuel supply valve when pressure of supplied fuel reaches a steady state.

2. Description of the Related Art

A fuel cell is a power generating device that directly converts chemical energy of fuel (for example, hydrogen, methanol, coal, natural gas, oil, biomass gas, landfill gas, etc.) into electric energy based on electrochemical reactions. The fuel cell generates electricity and heat simultaneously while providing higher efficiency of power generation and producing less harmful materials than typical power generation technologies.

A fuel cell stack is configured with a plurality of unit cells that are arranged successively, wherein each unit cell includes a membrane-electrode assembly (MEA) at the innermost portion, the MEA including an electrolyte film for moving hydrogen protons and electrode layers applied on both surfaces of the electrolyte film to cause reactions of hydrogen and oxygen. A fuel cell system adjusts the flow of fuel supplied to the fuel cell stack to output target current. More specifically, to supply fuel of target pressure that corresponds to a target voltage, the fuel cell system determines a controlled variable of a fuel supply valve using a difference between target pressure and actual pressure of fuel currently supplied.

SUMMARY

Therefore, an aspect of the present disclosure provides a fuel cell system of applying, when actual pressure of supplied fuel reaches a steady state, smaller gain than in a transient state to determine a controlled variable of a fuel supply valve, and a method of controlling the fuel cell system. Additional aspects of the disclosure will be set forth in part in the description which follows and, in part, will be obvious from the description, or may be learned by practice of the disclosure.

In accordance with one aspect of the present disclosure, a fuel cell system may include a fuel cell stack configured to receive fuel, and to generate electric energy; a fuel supply valve configured to adjust pressure of fuel supplied to the fuel cell stack; and a controller configured to operate the fuel supply valve to supply fuel of predetermined target pressure to the fuel cell stack, using a difference between the predetermined target pressure and actual pressure of the fuel being supplied, wherein when the actual pressure reaches a steady state from a transient state, the controller may be configured to apply a smaller gain than in the transient state to determine a first controlled variable based on the difference between the target pressure and the actual pressure of the fuel being supplied.

When the actual pressure is in the transient state, the controller may be configured to apply first P gain to the difference between the target pressure and the actual pressure to determine the first controlled variable, and when the actual pressure reaches the steady state, the controller may be configured to apply second P gain to the difference between the target pressure and the actual pressure to determine the first controlled variable, wherein the second P gain is smaller than the first P gain.

When a change of the actual pressure is equal to or less than a second threshold value when a change of the target pressure is equal to or less than a first threshold value, the controller may be configured to determine that the actual pressure reaches the steady state. When a difference between a maximum value and a minimum value of the actual pressure is equal to or greater than a third threshold value when the actual pressure is in the steady state, the controller may be configured to apply smaller gain than in the transient state to determine the first controlled variable based on the difference between the target pressure and the actual pressure.

Further, when the actual pressure is in the steady state, the controller may be configured to apply smaller gain than in the transient state to the difference between the target pressure and the actual pressure to determine the first controlled variable, and then monitor whether the difference between the target pressure and the actual pressure is equal to or greater than a fourth threshold value. When the difference between the target pressure and the actual pressure is equal to or greater than the fourth threshold value, the controller may be configured to apply a greater gain than in the steady state to the difference between the target pressure and the actual pressure to determine the first controlled variable. When the difference between the target pressure and the actual pressure is equal to or greater than the fourth threshold value, the controller may be configured to apply the same gain as in the transient state to the difference between the target pressure and the actual pressure to determine the first controlled variable.

The controller may further be configured to determine a second controlled variable of the fuel supply valve by integrating the difference between the target pressure and the actual pressure. When the actual pressure reaches the steady state from the transient state, the controller may be configured to apply a smaller I gain than in the transient state to a value obtained by integrating the difference between the target pressure and the actual pressure to determine the second controlled variable. The fuel cell system may further include a purge valve configured to form a path for discharging the fuel remaining in the fuel cell stack, wherein when the purge valve opens, the controller may be configured to estimate an amount of the fuel to be discharged through the path, and adjust an opening degree of the fuel supply valve based on the estimated amount of the fuel.

In accordance with another aspect of the present disclosure, a method of controlling a fuel cell system may include opening a fuel supply valve to supply fuel to a fuel cell stack; determining a controlled variable of the fuel supply valve using a difference between target pressure and actual pressure of the fuel being supplied; and adjusting an opening degree of the fuel supply valve based on the controlled variable, wherein the determination of the controlled variable includes applying a smaller gain than in the transient state when the actual pressure reaches a steady state from a transient state, to determine a first controlled variable based on the difference between the target pressure and the actual pressure of the fuel being supplied.

The determination of the first controlled variable may include: applying first P gain to the difference between the target pressure and the actual pressure to determine the first controlled variable, when the actual pressure is in the transient state; and applying, second P gain to the difference between the target pressure and the actual pressure when the actual pressure reaches the steady state, to determine the first controlled variable, wherein the second P gain is smaller than the first P gain. The determination of the first controlled variable may further include determining that the actual pressure reaches the steady state, when a change of the actual pressure is equal to or less than a second threshold value when a change of the target pressure is equal to or less than a first threshold value.

Additionally, the determination of the first controlled variable may include when applying a smaller gain than in the transient state a difference between a maximum value and a minimum value of the actual pressure is equal to or greater than a third threshold value when the actual pressure is in the steady state, to determine the first controlled variable based on the difference between the target pressure and the actual pressure. The determination of the first controlled variable may further include applying a smaller gain than in the transient state to the difference between the target pressure and the actual pressure when the actual pressure is in the steady state, to determine the first controlled variable, and then monitoring whether the difference between the target pressure and the actual pressure is equal to or greater than a fourth threshold value.

The determination of the first controlled variable may further include applying a larger gain than in the steady state to the difference between the target pressure and the actual pressure when the difference between the target pressure and the actual pressure is equal to or greater than the fourth threshold value, to determine the first controlled variable. The application of the larger gain than in the steady state to the difference between the target pressure and the actual pressure to determine the first controlled variable may include applying the same gain as in the transient state to the difference between the target pressure and the actual pressure when the difference between the target pressure and the actual pressure is equal to or greater than the fourth threshold value, to determine the first controlled variable.

The determination of the controlled variable may further include determining a second controlled variable of the fuel supply valve by integrating the difference between the target pressure and the actual pressure. Additionally, the determination of the second controlled variable may include applying a smaller I gain than in the transient state to a value obtained by integrating the difference between the target pressure and the actual pressure when the actual pressure reaches the steady state from the transient state, to determine the second controlled variable.

The method may further include: opening a purge valve to form a path for discharging the fuel remaining in the fuel cell stack; and estimating an amount of the fuel to be discharged through the path for discharging the fuel, and adjusting an opening degree of the fuel supply valve based on the estimated amount of the fuel.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of a fuel cell system and a control method thereof will be described in detail with reference to the accompanying drawings.

Figure 1:
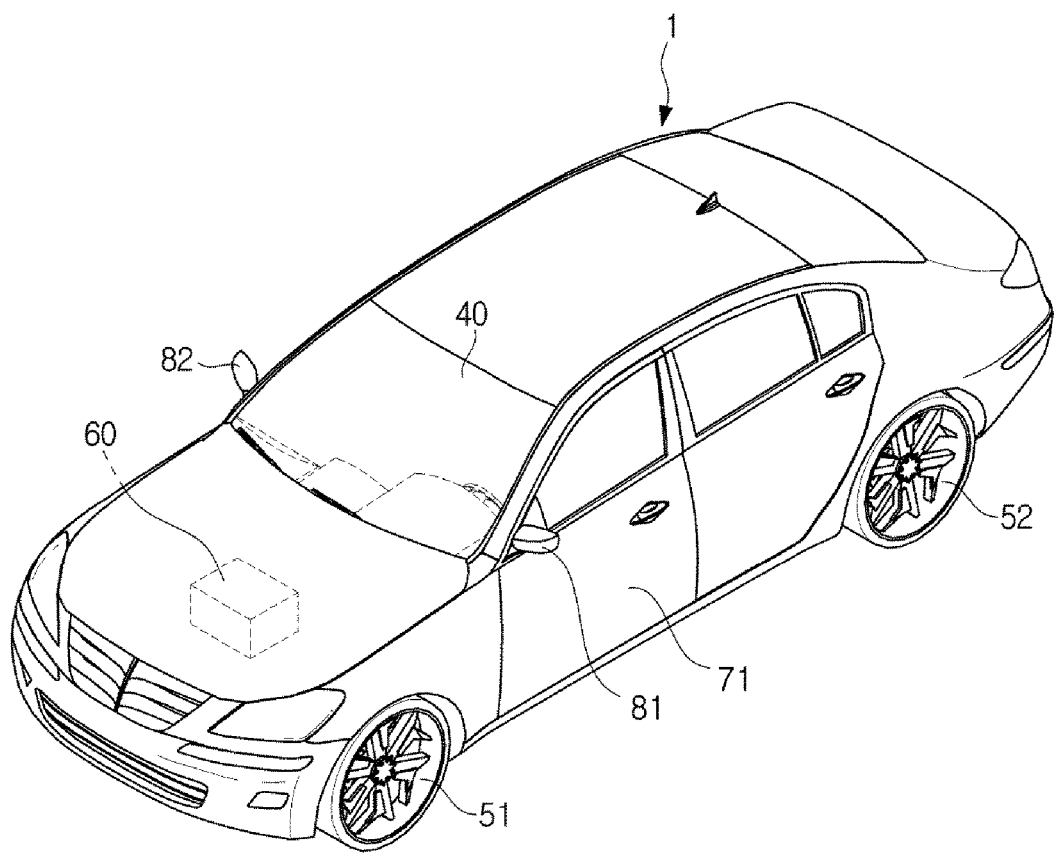
FIG. 1 shows an outer appearance of a vehicle including a fuel cell system according to an exemplary embodiment of the present disclosure.
Figure 2:
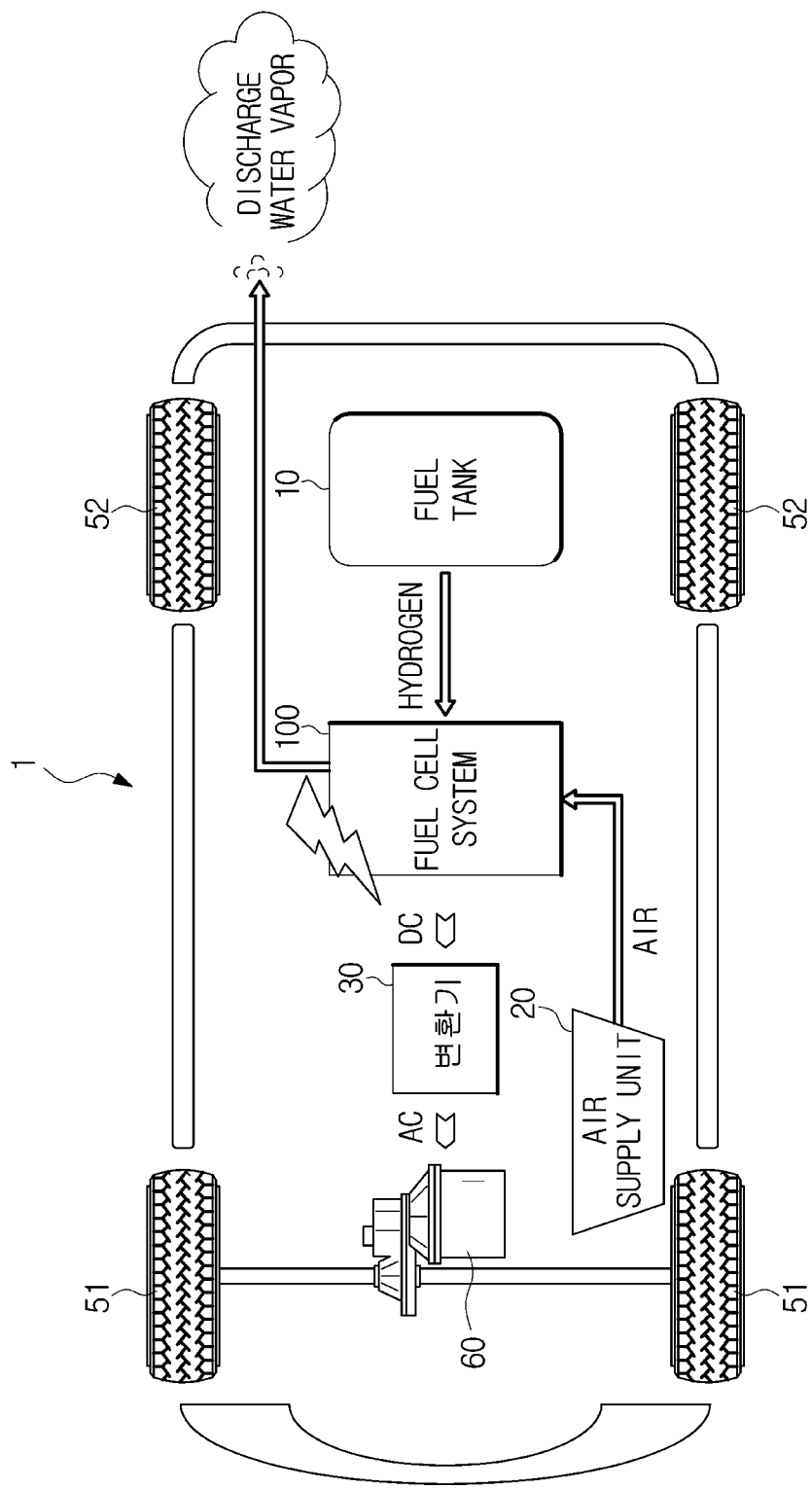
FIG. 2 is a configuration diagram of a vehicle including a fuel cell system according to an exemplary embodiment of the present disclosure.

FIG. 1 shows an outer appearance of a vehicle including a fuel cell system according to an exemplary embodiment of the present disclosure, and FIG. 2 is a configuration diagram of a vehicle including a fuel cell system according to an exemplary embodiment of the present disclosure. Referring to FIGS. 1 and 2, a vehicle 1 according to exemplary an embodiment of the present disclosure may include: a plurality of wheels 51 and 52 configured to move the vehicle 1; a driving apparatus 60 configured to rotate the wheels 51 and 52; a plurality of doors 71 configured to shield the inside of the vehicle 1 from the outside; a front glass 40 configured to provide a driver in the inside of the vehicle 1 with a front view of the vehicle 1; and side-view mirrors 81 and 82 configured to provide the driver with a rear view of the vehicle 1.

The front glass 40 may be disposed in the upper, front part of the vehicle 1 to provide the driver inside the vehicle with a front view of the vehicle 1. The front glass 40 is also referred to as a windshield glass. The side-view mirrors 81 and 82 may include a left side-view mirror 81 disposed at a left side of the vehicle 1 and a right side-view mirror 82 disposed at a right side of the vehicle 1 to provide the driver inside the vehicle 1 with visual information of side and rear views of the vehicle 1. The wheels 51 and 52 may include a plurality of front wheels 51 disposed in the front part of the vehicle 1, and a plurality of rear wheels 51 disposed in the rear part of the vehicle 1. The driving apparatus 60 may provide rotatory power to the front wheels 51 or the rear wheels 52 to move the vehicle 1 forward or backward. FIGS. 1 and 2 relate to a front wheel driving method of applying rotatory power to the front wheels 51. Many typical vehicles adopt, as the driving apparatus 60, an internal combustion engine of burning fossil fuel such as oil to generate rotatory power. However, the driving apparatus 60 of the vehicle 1 according to an exemplary embodiment of the present disclosure may adopt a motor configured to receive power from a fuel cell system 100 to generate rotatory power.

Particularly, the fuel cell system 100 may be configured to receive fuel from a fuel tank 10 in which fuel is stored, and receive air from an air supply unit 20 to generate electric energy. The electric energy may be transferred to the driving apparatus 60. For example, electric energy generated by the fuel cell system 100 may be converted to alternating-current (AC) power from direct-current (DC) power using a converter 30, and then transferred to the driving apparatus 60. The converter 30 may include a booster configured to boost a voltage, and an inverter configured to convert DC power to AC power. When the fuel cell system 100 uses hydrogen as fuel, water vapor ($H_2O$) generated by a reaction of hydrogen and oxygen will be discharged, instead of exhaust gas, such as carbon monoxide, nitrogen oxides, etc., which is generated when fossil fuel is used.

Figure 3:
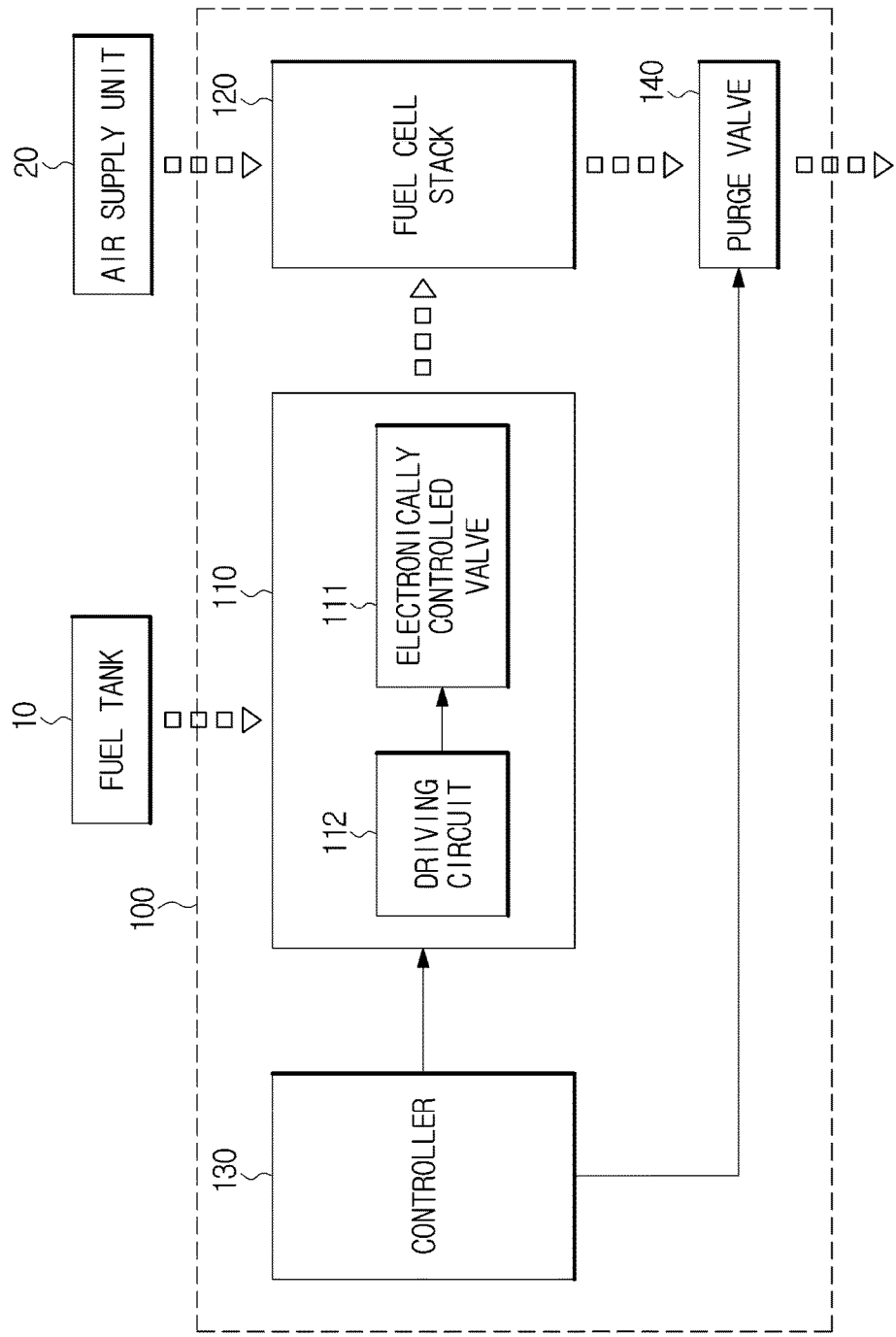
FIG. 3 is a control block diagram of the fuel cell system 100 according to an exemplary embodiment of the present disclosure.
Figure 4:
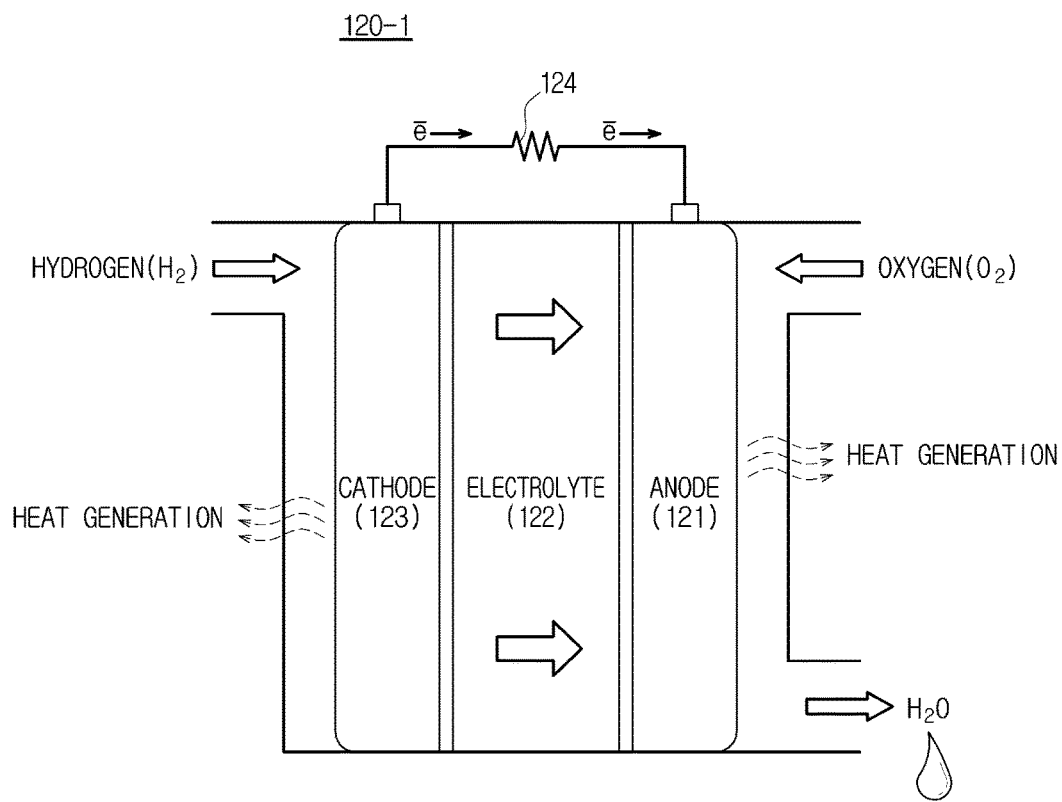
FIG. 4 shows a configuration of a unit cell included in the fuel cell system 100 according to an exemplary embodiment of the present disclosure.

FIG. 3 is a control block diagram of the fuel cell system 100 according to an exemplary embodiment of the present disclosure, and FIG. 4 shows a configuration of a unit cell included in the fuel cell system 100 according to an exemplary embodiment of the present disclosure. Referring to FIG. 3, the fuel cell system 100 according to an exemplary embodiment of the present disclosure may include: a fuel supply valve 110 configured to adjust flow of fuel stored in the fuel tank 10 and to supply the fuel to a fuel cell stack 120; the fuel cell stack 120 configured to generate electric energy by a reaction of hydrogen and oxygen when fuel is received through the fuel supply valve 110 and oxygen is received through the air supply unit 20; and a controller 130 configured to operate the fuel supply valve 110.

In FIG. 3, the fuel tank 10 and the air supply unit 20 are shown to be excluded from the configuration of the fuel cell system 100, however, the fuel tank 10 or the air supply unit 20 may be included in the configuration of the fuel cell system 100, according to changes in the design. Meanwhile, the fuel cell system 100 of FIG. 3 may adopt hydrogen as fuel supplied to the fuel cell stack 120. Accordingly, hydrogen may be stored in the fuel tank 10. However, in some cases, fuel of hydrocarbon series, such as methanol, gasoline, LPG, etc., may be stored in the fuel tank 10, and a reformer configured to decompose such fuel of hydrocarbon series to generate hydrogen may be disposed between the fuel tank 10 and the fuel supply valve 110. In other words, the type of fuel or a source of hydrogen supply stored in the fuel tank 10 is not limited, as long as it is capable of supplying hydrogen to the fuel cell stack 120 through the fuel supply valve 110.

The fuel cell stack 120 may be formed by stacking a plurality of unit cells 120-1, for example, several to hundreds of unit cells 120-1, as shown in FIG. 4. Hereinafter, a process in which the unit cells 120-1 generate electric energy will be described with reference to FIG. 4. Referring to FIG. 4, when oxygen is supplied to an anode 121 to each unit cell 120-1 and hydrogen is supplied to a cathode 123 of the unit cell 120-1, a reverse reaction of water electrolysis may be performed to generate electric energy. More specifically, when hydrogen molecules $H_2$ are supplied to the cathode 123, the hydrogen molecules $H_2$ may be split into hydrogen protons $H^+$ and electrons $e^-$ by a catalyst. The hydrogen protons $H^+$ may pass through electrolyte 122, whereas the electrons $e^-$ may not pass through the electrolyte 122. Instead, the electrons $e^-$ may flow to an external circuit 124 to generate DC electricity.

When oxygen molecules $O_2$ are supplied to the anode 121, the oxygen molecules $O_2$ may be combined with hydrogen protons $H^+$ and electrons $e^-$ passed through the electrolyte 122 to generate water $H_2O$ and heat. The unit cells 120-1 may be included in a single membrane electrode assembly (MEA), and a plurality of MEAs may be connected in series to constitute the fuel cell stack 120. Accordingly, the fuel cell stack 120 may generate a high voltage compared to a single unit cell 120-1.

Referring again to FIG. 3, the controller 130 may be configured to operate the fuel supply valve 110 based on power required for driving of the vehicle 1 to adjust flow of hydrogen supplied to the fuel cell stack 120. In FIG. 3, the fuel supply valve 110 is shown as starting or stopping the supply of fuel while adjusting flow of fuel is shown. However, the exemplary embodiments of the present disclosure are not limited to this, and the fuel supply valve 110 may be provided for adjusting flow of fuel and a separate device for starting or stopping the supply of fuel may be provided.

Referring to FIG. 3, the fuel supply valve 110 may include an electronically-controlled valve 111 configured to automatically adjust an opening a degree of the valve, and a driving circuit 112 configured to apply an electrical signal to the electronically-controlled valve 111. The fuel supply valve 110 may adopt, as the electronically-controlled valve 111, one of various types of valves that are automatically controlled. For example, the electronically-controlled valve 111 may be implemented as a solenoid valve using an electromagnet. The solenoid valve may start or stop the supply of fluids or adjust the pressure (that is, flow) of supplied fluids by carrying electricity through a solenoid coil configured with a core. Hereinafter, a case in which the fuel supply valve 110 adopts, as the electronically-controlled valve 111, a solenoid valve capable of adjusting flow of supplied fluids while starting/stopping the supply of fluids will be described as an example.

The electronically-controlled valve 111 implemented as a solenoid valve may be configured to adjust an opening degree of the valve based on a supplied pulse width modulation (PWN) carrier frequency to change the pressure of fuel supplied to the fuel cell stack 120. More specifically, the controller 130 may be configured to change the duty of a PWM signal applied to the electronically-controlled valve 111 to thus adjust the opening degree of the electronically-controlled valve 111 with a controlled variable that corresponds to the duty. Further, the controller 130 may be configured to perform feedback control to determine a duty value of the PWM signal. More specifically, the controller 130 may be configured to detect actual pressure of fuel that is currently supplied, compare the actual pressure to target pressure of fuel, and determine duty that corresponds to the opening degree of the electronically-controlled valve 111 based on the result of the comparison.

The feedback control executed by the controller 130 may include proportional control in which control pressure may be generated in proportion to current flowing through the solenoid coil of the electronically-controlled valve 111 and valve displacement may be determined based on a spring force applied to the valve, hydraulic pressure generated by exit control pressure fed back to the valve, etc., proportional integral (PI) control to accumulate errors and add the result of the accumulation to a controlled variable to reduce residual errors in the proportional control, and proportional integral differential (PID) control to compensate response speed.

Figure 5A:
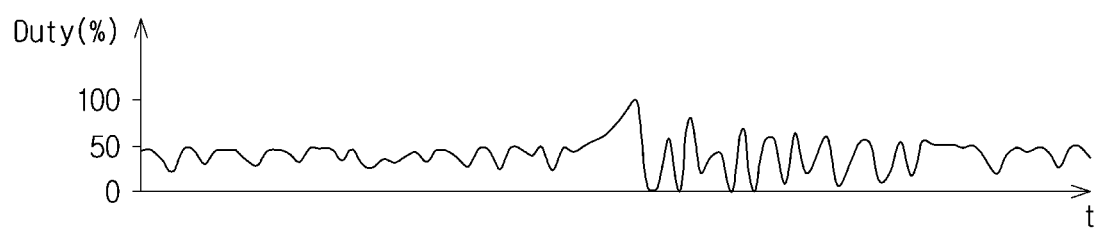
FIG. 5A is a graph showing the duty of a pulse width modulation (PWM) signal generated by the controller 130 according to an exemplary embodiment of the present disclosure.

Hereinafter, a method in which the controller 130 adjusts pressure of supplied fuel will be described in detail. FIG. 5A is a graph showing the duty of a PWM signal generated by the controller 130 according to an exemplary embodiment of the present disclosure, and FIG. 5B is a graph showing target pressure according to an exemplary embodiment of the present disclosure and actual pressure decided according to the PWM signal of FIG. 5A.

Figure 5B:
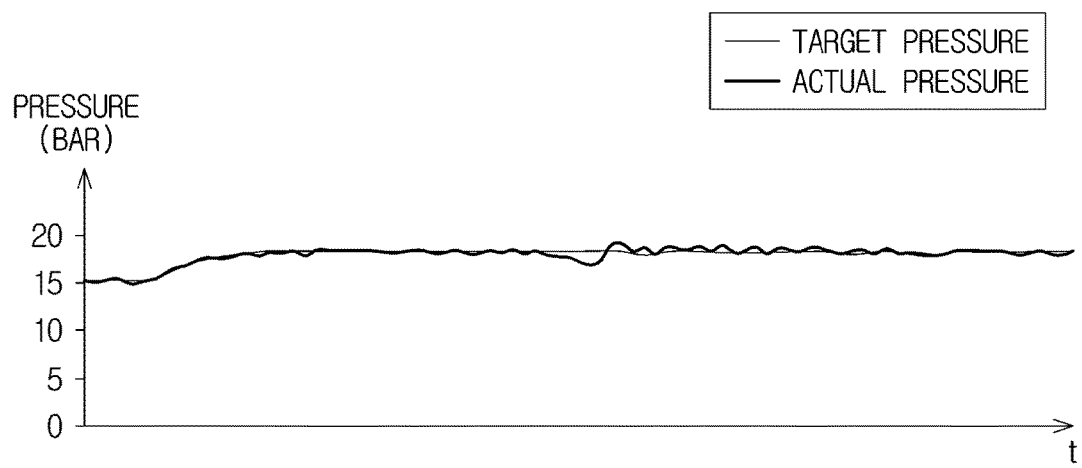
FIG. 5B is a graph showing target pressure according to an exemplary embodiment of the present disclosure and actual pressure decided according to the PWM signal of FIG. 5A.

When target pressure is set as shown in FIG. 5B, the controller 130 may be configured to change the duty of the PWM signal, as shown in FIG. 5A, to adjust an opening degree of the fuel supply valve 110. Particularly, the duty of the PWM signal may have a linear relationship with an opening degree of the fuel supply valve 110 for a predetermined time period. For example, in a time period for which the duty of the PWM signal is about 25% to 80%, an opening degree of the fuel supply valve 110 may change linearly. In other words, the duty of the PWM signal may indicate a controlled variable with respect to the fuel supply valve 110.

When the controller 130 executes the PI control, the controller 130 may be configured to detect actual pressure in real time, and determine a duty value using a difference (e.g., an error) between the actual pressure and the target pressure. More specifically, the controller 130 may be configured to determine P gain applied to the error, in consideration of speed at which the actual pressure approaches the target pressure, overshoot, etc., and apply the P gain to the error to acquire a first controlled variable. Additionally, to reduce errors after the actual pressure reaches a steady state, the controller 130 may be configured to determine I gain applied to an accumulated value of errors, apply the I gain to the accumulated value of errors to acquire a second controlled variable. Finally, the controller 130 may be configured to determine the duty of the PWM signal based on a controlled variable including the first controlled variable and the second controlled variable, thereby adjusting the opening degree of the fuel supply valve 110.

Since the pressure of supplied fuel increases as the degree of opening of the fuel supply valve 110 increases, the controller 130 may be configured to adjust the pressure of supplied fuel by changing a controlled variable with respect to the fuel supply valve 110. When the PWM signal of FIG. 5A is applied to the fuel supply valve 110, the actual pressure of fuel supplied to the fuel cell stack 120 may follow (e.g., correspond to) the actual pressure shown in FIG. 5B. Since the PWM signal has duty that corresponds to the target pressure, the actual pressure may follow (e.g., correspond to) the target pressure.

Meanwhile, after the actual pressure follows the target pressure to reach a steady state, a chattering phenomenon in which the actual pressure fluctuates excessively may occur. When a sharp change of the duty occurs after a specific time as shown in FIG. 5A, sharp fluctuation of the actual pressure may occur accordingly, as shown in FIG. 5B. As a result, the opening degree of the fuel supply valve 110 may change frequently, which may increase the amount of consumption current. Additionally, as the fuel supply valve 110 is frequently driven, durability may be decreased.

Accordingly, it may be possible to reduce the P gain applied to the error and/or the I gain applied to the accumulated value of errors. However, when the actual pressure is in a transient state, adjusting the actual pressure using a smaller P gain and a smaller I gain than before may decrease speed at which the actual pressure follows (e.g., reaches) the target pressure. Accordingly, the controller 130 according to an exemplary embodiment of the present disclosure may be configured to determine whether the actual pressure reaches the steady state, and then reduce the P gain and/or the I gain in response to determining that the actual pressure reaches the steady state, thereby reducing the chattering phenomenon.

Figure 6:
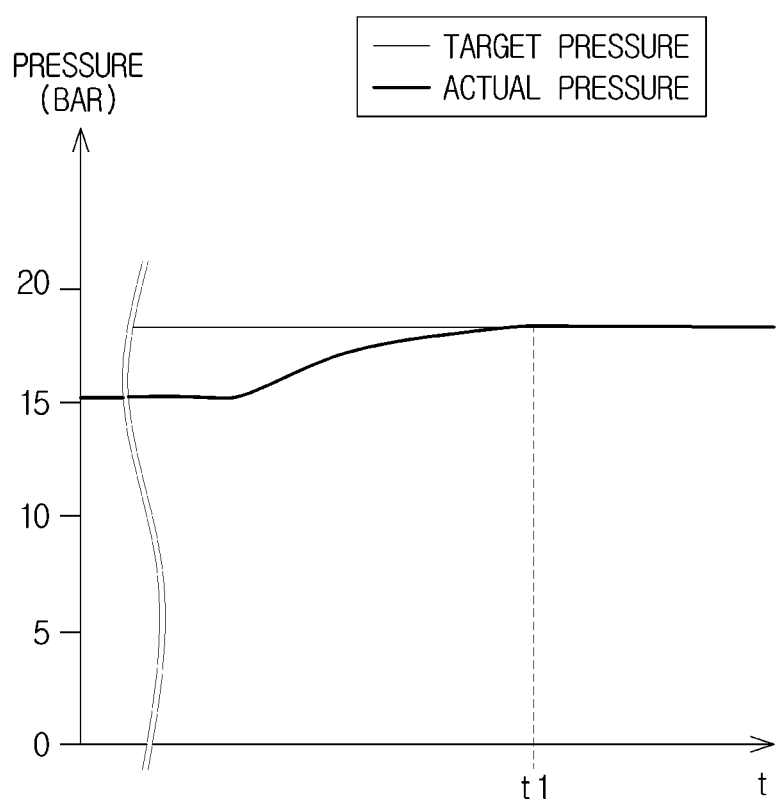
FIG. 6 is a view for describing a method in which the controller 130 according to an exemplary embodiment of the present disclosure determines whether actual pressure reaches a steady state.
Figure 7:
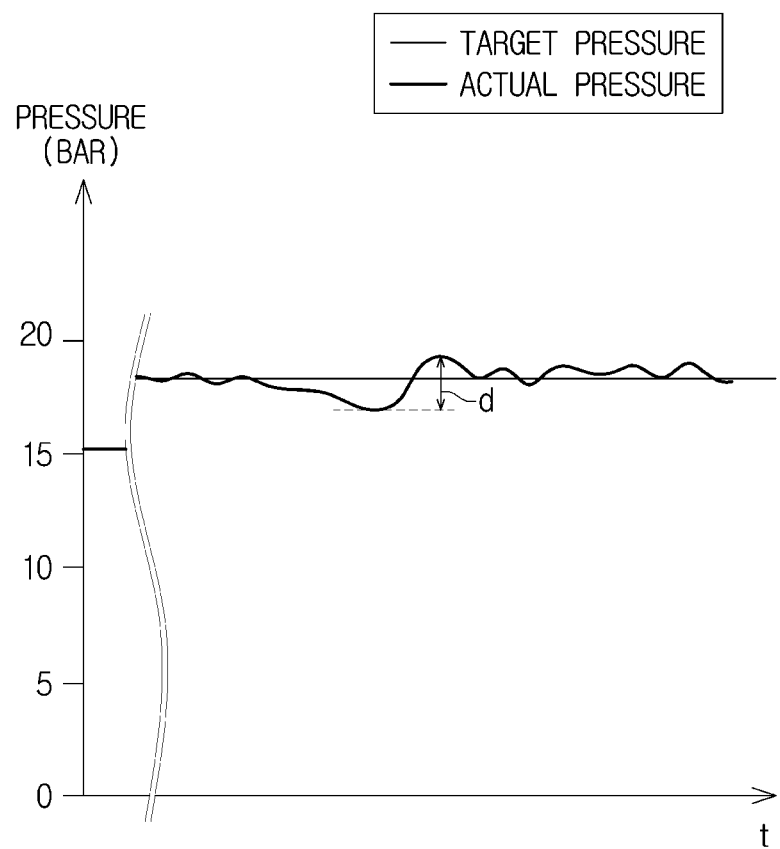
FIG. 7 is a view for describing a method in which the controller 130 according to an exemplary embodiment of the present disclosure determines whether chattering occurs when the actual pressure is in the steady state.
Figure 8:
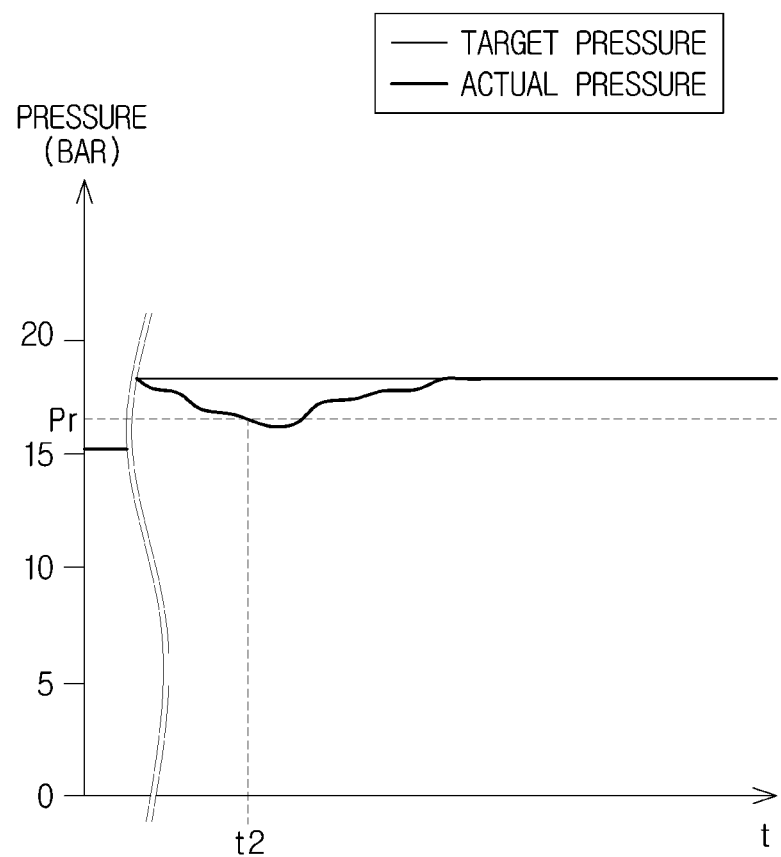
FIG. 8 is a view for describing operation after chattering reduction operation of the controller 130 according to an exemplary embodiment of the present disclosure.

Hereinafter, operations in which the controller 130 reduces the chattering phenomenon will be described in detail with reference to FIGS. 6, 7, and 8. FIG. 6 is a view for describing a method in which the controller 130 according to an exemplary embodiment of the present disclosure determines whether actual pressure reaches a steady state, FIG. 7 is a view for describing a method in which the controller 130 according to an exemplary embodiment of the present disclosure determines whether chattering occurs when the actual pressure is in the steady state, and FIG. 8 is a view for describing operation after chattering reduction operation of the controller 130 according to an exemplary embodiment of the present disclosure.

As described above, the controller 130 may be configured to lower gain after actual pressure reaches a steady state to determine a controlled variable. Accordingly, the controller 130 may be configured to determine whether actual pressure reaches a steady state. Referring to FIG. 6, the controller 130 may be configured to determine whether target pressure changes. More specifically, the controller 130 may be configured to determine whether a change of target pressure is equal to or less than a first threshold value. Herein, the change of the target pressure may indicate a difference in target pressure between a current time and the previous time, and the first threshold value may be determined in advance by an external input or internal computation.

When the change of the target pressure is greater than the first threshold value, actual pressure may require change based on the changed target pressure, and thus, the controller 130 may be configured to newly set P gain and/or I gain in correspondence to the changed target pressure. Meanwhile, when the change of the target pressure is equal to or less than the first threshold value, the controller 130 may be configured to determine whether actual pressure changes. More specifically, the controller 130 may be configured to determine whether a change of actual pressure is equal to or less than a second threshold value. Herein, the change of the actual pressure may indicate a change in actual pressure between the current time and the previous time, and the second threshold value may be determined in advance by an external input or internal computation.

When the change of the actual pressure is greater than the second threshold value, this indicates that the actual pressure is in a transient state, and thus, the controller 130 may be configured to maintain P gain and/or I gain to adjust the actual pressure to correspond to the target pressure to thus operate the fuel supply valve 110. Meanwhile, when the change of the actual pressure is equal to or less than the second threshold value, the controller 130 may be configured to determine that the actual pressure reaches the steady state. In FIG. 6, at the time of t1, the controller 130 may be configured to determine that the actual pressure reaches the steady state.

After the actual pressure reaches the steady state, the controller 130 may be configured to determine whether the chattering phenomenon occurs in the actual pressure. More specifically, the controller 130 may be configured to determine whether a difference between the maximum value and the minimum value of the actual pressure is equal to or greater than a third threshold value, thereby determining whether the chattering phenomenon occurs. Herein, the third threshold value may be determined in advance by an external input or internal computation.

Referring to FIG. 7, the controller 130 may be configured to compare a difference d between the maximum value of the actual pressure which is in the steady state and the minimum value of the actual pressure to the third threshold value. When the controller 130 determines that the difference d is less than the third threshold value, the controller 130 may be configured to determine that no chattering reduction operation is required, and determine that no chattering occurs. In particular, the controller 130 may be configured to maintain the actual pressure in the steady state using the previous P gain and/or the previous I gain.

Meanwhile, when the controller 130 determines that the difference d is equal to or greater than the third threshold value, the controller 130 may be configured to determine that chattering occurs. Accordingly, the controller 130 may be configured to perform operation of reducing chattering. More specifically, the controller 130 may be configured to determine a controlled variable using a smaller P gain and/or a smaller I gain than in the transient state.

For example, the controller 130 may be configured to apply a smaller P gain than in the transient state, to a difference (that is, an error) between the target pressure and the actual pressure, to acquire a first controlled variable. Additionally, the controller 130 may be configured to apply a smaller I gain than in the transient state, to an accumulated value of errors, to acquire a second controlled variable. The controller 130 may further be configured to determine the duty of the PWM signal based on a controlled variable including the first controlled variable and the second controlled variable, and apply the resultant PWM signal to the fuel supply valve 110, thereby reducing chattering of the actual pressure.

Furthermore, the controller 130 may be configured to determine the duty of the PWM signal according to any one of the first controlled variable and the second controlled variable. When the controller 130 determines that the actual pressure reaches the steady state, the controller 130 may be configured to perform chattering reduction operation regardless of whether or not chattering occurs. Meanwhile, applying the smaller P gain and/or the smaller I gain may increase a difference (that is, an error) between actual pressure and the target pressure. Accordingly, after performing the chattering reduction operation, the controller 130 may be configured to monitor whether the error is equal to or greater than a fourth threshold value. Herein, the fourth threshold value may be determined in advance by an external input or internal computation.

Referring to FIG. 8, the controller 130 may be configured to perform monitoring by comparing the actual pressure to reference pressure Pr having a difference of the fourth threshold value with the target pressure. Through the monitoring, the controller 130 may be configured to determine that actual pressure decreases to less than the reference pressure Pr, at the time of t2. When the controller 130 determines that the difference between the target pressure and the actual pressure is equal to or greater than the fourth threshold value, as the result of the monitoring, the controller 130 may be configured to determine a controlled variable using greater P gain and/or greater I gain than in the steady state. More specifically, the controller 130 may be configured to determine a controlled variable using the P gain and/or the I gain used in the transient state.

For example, when the controller 130 determines that the error is equal to or greater than the fourth threshold value, the controller 130 may be configured to again use the P gain used in the transient state to determine a first controlled variable. In addition, the controller 130 may be configured to again use the I gain used in the transient state to determine a second controlled variable. Then, the controller 130 may be configured to operate the fuel supply valve 110 based on a controlled variable obtained by summing the first controlled variable and the second controlled variable. The controller 130 may be configured to determine the duty of the PWM signal according to any one of the first controlled variable and the second controlled variable, wherein the any one of the first controlled variable and the second controlled variable is determined by selecting any one from the P gain and the I gain used in the transient state. As a result, the actual pressure may be adjusted to be the target pressure to reach the steady state. As seen in FIG. 8, the controller 130 may be configured to apply the P gain and/or the I gain used in the transient state from after the time of t2 and thus the actual pressure again may be adjusted to be the target pressure.

Accordingly, the fuel cell system 100 may reduce chattering in the steady state, without decreasing speed at which the actual pressure follows the target pressure, and may reduce current consumption accordingly. Additionally, the durability of the fuel supply valve 110 may increase along with the reduction of chattering. By monitoring actual pressure in real time after the chattering reduction operation, it may be possible to prevent actual pressure from not reaching the target pressure.

Meanwhile, the fuel cell system 100 may require discharging of fuel remaining in the fuel cell stack 120 and receiving new fuel, to increase the generation efficiency of electric energy. Accordingly, the fuel cell system 100 may further include a purge valve 140 (see FIG. 3) configured to form a path for discharging fuel remaining in the fuel cell stack 120. Referring to FIG. 3, the controller 130 may be configured to adjust an opening degree of the purge valve 140 to form a path for discharging fuel remaining in the fuel cell stack 120. When the purge valve 140 opens, a pressure difference may be generated between the inside of the fuel cell stack 120 and the outside of the fuel cell stack 120. As a result, fuel may be discharged from the inside of the fuel cell stack 120 at high pressure to the outside of the fuel cell stack 120 at low pressure.

Since fuel existing in the inside of the fuel cell stack 120 may be excessively discharged, the controller 130 may be configured to estimate an amount of fuel to be discharged, and adjust the opening degree of the fuel supply valve 110 based on the estimated amount of fuel to be discharged. Accordingly, the controller 130 may be configured to perform feed-forward control of the fuel supply valve 110. For example, when the purge valve 140 opens, the controller 130 may be configured to open the fuel supply valve 110 to the maximum level to increase an amount of fuel supplied to the fuel cell stack 120.

When the controller 130 determines that fuel remaining in the fuel cell stack 120 has been sufficiently discharged, the controller 130 may be configured to close the purge valve 140. Then, the controller 130 may be configured to operate the fuel supply valve 110 using a difference between predetermined target pressure and actual pressure of fuel being supplied, according to the above-described method, to supply fuel of the predetermined target pressure to the fuel cell stack 120.

Figure 9:
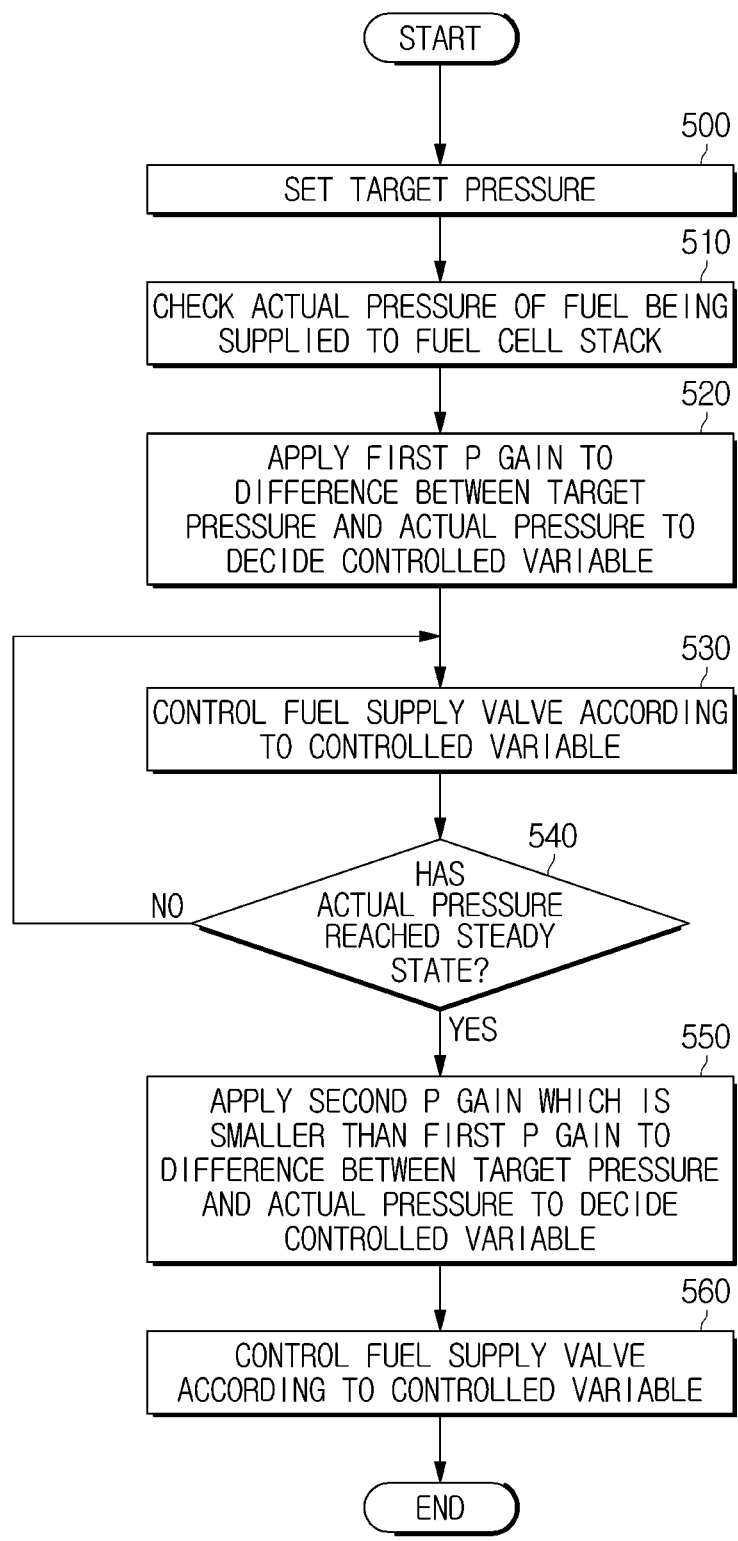
FIG. 9 is a flowchart illustrating a method of controlling the fuel cell system 100, according to an exemplary embodiment of the present disclosure.

FIG. 9 is a flowchart illustrating a method of controlling the fuel cell system 100, according to an exemplary embodiment of the present disclosure. The method may be executed by a controller. First, the fuel cell system 100 may be configured to set target pressure, in operation 500. More specifically, the fuel cell system 100 may be configured to detect a revolutions per minute (RPM) value that corresponds to target current, and detect air pressure supplied to the fuel cell stack 120 to acquire the RPM value. After detecting the air pressure, the fuel cell system 100 may be configured to determine target pressure of fuel corresponding to the air pressure.

Further, the fuel cell system 100 may be configured to detect actual pressure of fuel being supplied to the fuel cell stack 120, in operation 510. To detect the actual pressure of fuel, the fuel cell system 100 may include a sensor configured to measure the actual pressure of the fuel, although the fuel cell system 100 may use any other measuring devices. After detecting the actual pressure of fuel being supplied, the fuel cell system 100 may be configured to apply first P gain to a difference (that is, an error) between the target pressure and the actual pressure to determine a controlled variable, in operation 520. Herein, the controlled variable may be the first controlled variable described above with reference to FIGS. 6, 7, and 8.

After determining the controlled variable, the fuel cell system 100 may be configured to operate the fuel supply valve 110 according to the determined controlled variable, in operation 530. Then, the fuel cell system 100 may be configured to determine whether the actual pressure reaches a steady state, in operation 540. When the fuel cell system 100 determines that the actual pressure does not reach the steady state, the fuel cell system 100 may be configured to operate the fuel supply valve 110 repeatedly based on the controlled variable to adjust the actual pressure to be the target pressure.

Meanwhile, when the fuel cell system 100 determines that the actual pressure reaches the steady state, the fuel cell system 100 may be configured to apply second P gain to the difference between the target pressure and the actual pressure to determine a controlled variable, wherein the second P gain is less than the first P gain, in operation 550. Finally, the fuel cell system 100 may be configured to operate the fuel supply valve 110 based on the determined controlled variable, in operation 560. Accordingly, the fuel cell system 100 may reduce a chattering phenomenon generated in the actual pressure in the steady state.

According to the exemplary embodiments of the vehicle and the control method thereof, an opening degree of the fuel supply valve may be prevented from changing frequently to maintain actual pressure in a steady state. Since the opening degree of the fuel supply valve does not frequently change, consumption current of the fuel cell system may be reduced. In addition, since a sharp change in the opening degree of the fuel supply valve may be reduced, the durability of the fuel cell system may increase.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A fuel cell system, comprising:
   a fuel cell stack that receives fuel and generates electric energy;
   a fuel supply valve that adjusts pressure of fuel supplied to the fuel cell stack;
   a purge valve that forms a path for discharging the fuel remaining in the fuel cell stack; and
   a controller that operates the fuel supply valve to supply fuel of predetermined target pressure to the fuel cell stack, using a difference between the predetermined target pressure and actual pressure of the fuel being supplied,
   wherein when the actual pressure reaches a steady state from a transient state, the controller applies a smaller gain than in the transient state to determine a first controlled variable based on the difference between the target pressure and the actual pressure of the fuel being supplied, and
   wherein when the purge valve opens, the controller estimates an amount of the fuel that is to be discharged through the path, and adjusts an opening degree of the fuel supply valve based on the estimated amount of the fuel.

2. The fuel cell system according to claim 1, wherein when the actual pressure is in the transient state, the controller applies a first P gain to the difference between the target pressure and the actual pressure to determine the first controlled variable, and when the actual pressure reaches the steady state, the controller applies a second P gain to the difference between the target pressure and the actual pressure to determine the first controlled variable, wherein the second P gain is less than the first P gain.

3. The fuel cell system according to claim 1, wherein when a change of the actual pressure is equal to or less than a second threshold value and a change of the target pressure is equal to or less than a first threshold value, the controller determines that the actual pressure reaches the steady state.

4. The fuel cell system according to claim 1, wherein when a difference between a maximum value and a minimum value of the actual pressure is equal to or greater than a third threshold value and the actual pressure is in the steady state, the controller applies a smaller gain than in the transient state to determine the first controlled variable based on the difference between the target pressure and the actual pressure.

5. The fuel cell system according to claim 1, wherein when the actual pressure is in the steady state, the controller applies a smaller gain than in the transient state to the difference between the target pressure and the actual pressure to determine the first controlled variable, and monitors whether the difference between the target pressure and the actual pressure is equal to or greater than a fourth threshold value.

6. The fuel cell system according to claim 5, wherein when the difference between the target pressure and the actual pressure is equal to or greater than the fourth threshold value, the controller applies a larger gain than in the steady state to the difference between the target pressure and the actual pressure to determine the first controlled variable.

7. The fuel cell system according to claim 6, wherein when the difference between the target pressure and the actual pressure is equal to or greater than the fourth threshold value, the controller applies a same gain as in the transient state to the difference between the target pressure and the actual pressure to determine the first controlled variable.

8. The fuel cell system according to claim 1, wherein the controller determines a second controlled variable of the fuel supply valve by integrating the difference between the target pressure and the actual pressure.

9. The fuel cell system according to claim 8, wherein when the actual pressure reaches the steady state from the transient state, the controller applies a smaller I gain than in the transient state to a value obtained by integrating the difference between the target pressure and the actual pressure to determine the second controlled variable.

10. A method of controlling a fuel cell system, comprising:
opening, by a controller, a fuel supply valve to supply fuel to a fuel cell stack;
determining, by the controller, a controlled variable of the fuel supply valve using a difference between target pressure and actual pressure of the fuel being supplied;
adjusting, by the controller, an opening degree of the fuel supply valve based on the controlled variable;
opening, by the controller, a purge valve to form a path for discharging the fuel remaining in the fuel cell stack; and
estimating, by the controller, an amount of the fuel to be discharged through the path for discharging the fuel, and adjusting an opening degree of the fuel supply valve based on the estimated amount of the fuel,
wherein the determination of the controlled variable includes applying a smaller gain than in the transient state when the actual pressure reaches a steady state from a transient state, to determine a first controlled variable based on the difference between the target pressure and the actual pressure of the fuel being supplied.

11. The method according to claim 10, wherein the determination of the first controlled variable includes:
applying, by the controller, a first P gain to the difference between the target pressure and the actual pressure to determine the first controlled variable when the actual pressure is in the transient state; and
applying, by the controller, a second P gain to the difference between the target pressure and the actual pressure when the actual pressure reaches the steady state, to determine the first controlled variable, wherein the second P gain is less than the first P gain.

12. The method according to claim 10, wherein the determination of the first controlled variable includes determining that the actual pressure reaches the steady state, when a change of the actual pressure is equal to or less than a second threshold value when a change of the target pressure is equal to or less than a first threshold value.

13. The method according to claim 10, wherein the determination of the first controlled variable includes applying a smaller gain than in the transient state when a difference between a maximum value and a minimum value of the actual pressure is equal to or greater than a third threshold value when the actual pressure is in the steady state, to determine the first controlled variable based on the difference between the target pressure and the actual pressure.

14. The method according to claim 10, wherein the determination of the first controlled variable includes applying a smaller gain than in the transient state to the difference between the target pressure and the actual pressure when the actual pressure is in the steady state, to determine the first controlled variable, and monitoring whether the difference between the target pressure and the actual pressure is equal to or greater than a fourth threshold value.

15. The method according to claim 14, wherein the determination of the first controlled variable further includes applying a larger gain than in the steady state to the difference between the target pressure and the actual pressure when the difference between the target pressure and the actual pressure is equal to or greater than the fourth threshold value, to determine the first controlled variable.

16. The method according to claim 15, wherein the application of the larger gain than in the steady state to the difference between the target pressure and the actual pressure to decide the first controlled variable includes applying a same gain as in the transient state to the difference between the target pressure and the actual pressure when the difference between the target pressure and the actual pressure is equal to or greater than the fourth threshold value, to determine the first controlled variable.

17. The method according to claim 10, wherein the determination of the controlled variable further includes determining a second controlled variable of the fuel supply valve by integrating the difference between the target pressure and the actual pressure.

18. The method according to claim 17, wherein the determination of the second controlled variable includes applying a smaller I gain than in the transient state to a value obtained by integrating the difference between the target pressure and the actual pressure when the actual pressure reaches the steady state from the transient state, to determine the second controlled variable.

* * * * *